United States Patent [19]
Kitajima

[11] Patent Number: 5,513,977
[45] Date of Patent: May 7, 1996

[54] CLAMPING DEVICE FOR ELECTRIC-POWERED INJECTION MOLDING MACHINE

[75] Inventor: Masaya Kitajima, Chiba, Japan

[73] Assignee: Sumitomo Heavy Industries, Ltd., Japan

[21] Appl. No.: 284,449

[22] PCT Filed: Dec. 18, 1992

[86] PCT No.: PCT/JP92/01666

§ 371 Date: Aug. 5, 1994

§ 102(e) Date: Aug. 5, 1994

[87] PCT Pub. No.: WO94/14594

PCT Pub. Date: Jul. 7, 1994

[51] Int. Cl.$^6$ ................................. B29C 45/64
[52] U.S. Cl. ............ 425/593; 425/451.6; 425/DIG. 221
[58] Field of Search .................... 425/592, 593, 425/451.5, 451.6, DIG. 221

[56] References Cited

U.S. PATENT DOCUMENTS

| | | | |
|---|---|---|---|
| 3,507,012 | 4/1970 | Aoki et al. | 425/45.6 |
| 3,597,798 | 8/1970 | McDonald | 425/593 |
| 3,642,403 | 2/1972 | Havlik | 425/145 |
| 3,726,625 | 4/1973 | Rees | 425/593 |
| 4,341,511 | 7/1982 | Laurent et al. | 425/593 |
| 4,904,173 | 2/1990 | Tanada et al. | 425/451.6 |
| 5,350,291 | 9/1994 | Kitajima | 425/451.6 |

FOREIGN PATENT DOCUMENTS

| | | | |
|---|---|---|---|
| 0366810 | 4/1989 | European Pat. Off. | |
| 43-6309 | 3/1968 | Japan | 425/451.6 |
| 339223 | 2/1991 | Japan | |
| 4-39223 | 2/1991 | Japan | 425/593 |
| 4-259521 | 9/1992 | Japan | 425/593 |
| 4-364917 | 12/1992 | Japan | 425/451.6 |

Primary Examiner—Khanh P. Nguyen
Attorney, Agent, or Firm—Lorusso & Loud

[57] ABSTRACT

In a clamping device used in an electric-powered injection machine, a motor support (33) is resiliently supported relative to a rear platen (31), and a motor (35) is fixed to the motor support (33). A toggle mechanism is disposed between the motor support (33) and a movable platen (2), so that the movable platen (2) can be moved by driving the motor (35). A rod (45) is also provided to extend with one end abutable against the rear platen (31) and with the other end supporting the toggle mechanism. A reaction force against the clamping force is transmitted directly to the rear platen (31). Thus, it is possible to enhance the durability of the toggle mechanism and to provide an increased clamping force.

11 Claims, 3 Drawing Sheets

5,513,977

CLAMPING DEVICE FOR ELECTRIC-POWERED INJECTION MOLDING MACHINE

TECHNICAL FIELD

The present invention relates to a clamping device for an electric-powered injection molding machine.

BACKGROUND ART

In a conventional injection molding machine designed so that a resin heated and fluidized in a heating cylinder is injected and poured into a cavity in a mold under a high pressure, cooled, solidified and cured in the cavity, and then, the mold is opened to remove a molded product, a clamping device is provided to prevent the resin poured into the cavity from being leaked therefrom through matched surfaces of dies. In an electric-powered injection molding machine using a motor as a drive source, the opening and closing of the mold are carried out by a crank mechanism or a ball screw feed mechanism, and the die-clamping is carried out by a clamping cylinder.

In this case, when the die-clamping has been completed, an oil within the clamping cylinder is drained, and the opening of the mold is carried out by the crank mechanism or the ball screw feed mechanism (see Japanese Patent Application Laid-open No. 39223/91).

FIG. 1 is a schematic view of a clamping device for the prior art electric-powered injection molding machine.

Referring to FIG. 1, the injection molding machine includes a stationary platen 1 and a movable platen 2 which are mounted to dies 3a and 3b of a mold, respectively, and a toggle support 4 movable on a base 5. The movable platen 2 is moved by a single-toggle mechanism 6 disposed between the toggle support 4 and the movable platen 2, thereby performing the opening and closing of the mold.

Four parallel tie bars 7 are disposed at four corners of the toggle support and each slidably passes through holes 1a and 2a defined in the stationary and movable platens 1 and 2. Each of the tie bars 7 is fixed at one end thereof to the toggle support 4 and at the other end to a piston 9 in a clamping cylinder 8 mounted to the stationary platen 1. An oil chamber adjacent a rod of the clamping cylinder 8, i.e., adjacent the tie bar 7 is in communication with a small-sized hydraulic pressure generating unit 11.

The single-toggle mechanism 6 includes a bracket 12 fixed to the toggle support 4, a first link 13 pivotally supported on the bracket 12, a second link 14 pivotally mounted to the first link 13 through a link pin 18, and a bracket 15 rotatably supporting the second link 14 and fixed to the movable platen 2. The first link 13 has a shaft 16 connected to a drive shaft of a motor through a reducing device (e.g., a servo motor having a planetary gear reducing device connected thereto). The length of the first and second links 13 and 14 is set such that the dies 3a and 3b are brought into contact with each other, when the first and second links 13 and 14 have been expanded into a straight line. Such setting is performed by a die-thickness adjusting mechanism which is not shown.

A stopper 17 is fixed to the toggle support 4, so that when the first link 13 is rotated in the direction indicated by an arrow a to abut against the first link 13, a further rotation of the first link 13 is limited by the stopper 17 to retain the single-toggle mechanism at a dead-point position. At this dead-point position, the dies 3a and 3b are in contact with each other, so that the die-clamping is conducted by the clamping cylinder 8.

In the clamping cylinder 8, the piston 9 is mounted to the other end of the tie bar 7. However, the mounting of the piston 9 is not limited thereto, and for example, a hydraulic cylinder may be mounted to the other end of the tie bar 7. Further, the clamping cylinder 8 is mounted on the stationary platen 1, but alternatively, may be mounted on the toggle support 4.

The mold-opening and closing operation by the clamping device for the electric-powered injection molding machine will be described below.

When the motor is driven to rotate the first link 13 in the direction indicated by the arrow a through the shaft 16 to expand the first and second links 13 and 14 substantially into a straight line, the single-toggle mechanism 6 is brought into the dead-point position, thereby causing the first link 13 to be positioned and fixed. At this time, the dies 3a and 3b are brought into contact with each other, and the closing of the mold is carried out. The motor ensures that the first link 13 can be urged against the stopper 17 and placed at a stable position with a small torque.

After positioning of the first link 13 at the dead-point position of the single-toggle mechanism 6, a hydraulic pressure is supplied to the oil chambers which are defined adjacent the tie bars 7 and in the clamping cylinders 8 disposed at the other ends of the four tie bars 7, so that the tie bars 7 are pulled through the pistons 9 to generate a uniform and stable clamping force to bring the dies 3a and 3b into close contact with each other, thereby effecting the clamping of the mold.

In carrying out the opening of the mold, the oil within the oil chambers in the clamping cylinders 8 is drained and then the first link 13 of the single-toggle mechanism 6 is rotated in a counterclockwise direction (i.e., a direction opposite from the direction indicated by the arrow a).

In this way, the motor is used to move the movable platen 2, and the clamping cylinders 8 are used to generate the clamping force. Therefore, it is possible to use a small-sized motor.

In the above-described prior art clamping device for the electric-powered injection molding machine, however, roller bearings, which are not shown, are used to support the shaft 16 for connecting the motor with the first link 13 of the single-toggle mechanism 6 and to support the link pin 18 provided between the first and second links 13 and 14. The roller bearings have a load-carrying capacity and may be deviationally worn or fractured, when they receive a large clamping force.

Accordingly, it is an object of the present invention to provide a clamping device for an electric-powered injection molding machine, wherein the problems associated with the prior art clamping device for the electric-powered injection molding machine are overcome, whereby the durability of a toggle mechanism such as the above-described single-toggle mechanism can be enhanced, and an increased clamping force can be provided.

DISCLOSURE OF THE INVENTION

To achieve the above object, according to the present invention, there is provided a clamping device for an electric-powered injection molding machine, comprising a stationary platen, a rear platen disposed in an opposed relation to the stationary platen, a movable platen disposed between the stationary platen and the rear platen for advancing and retreating movements along tie bars, a motor support resiliently supported relative to the rear platen with a biasing force smaller than the clamping force, a motor fixed to the motor support, a toggle mechanism interconnecting the motor support and the movable platen for moving the movable platen by reception of the rotation of the motor, and a reaction force transmitting member for transmitting a reaction force against the clamping force transmitted to the toggle mechanism, directly to the rear platen without transmission through the motor support.

With the above construction, the motor support is biased toward the movable platen during opening and closing of a mold, so that it is resiliently supported with the biasing force smaller than the clamping force relative to the rear platen, but during clamping of the mold, the motor support is moved toward the rear platen. Therefore, during opening and closing of the mold, a drive shaft of the motor is supported by bearings, but during clamping of the mold, a reaction force generated by the clamping force is not transmitted to the bearings, but is transmitted through the reaction force transmitting member to the rear platen. Thus, the bearings cannot be deviationally worn or fractured, and the durability of the toggle mechanism can be enhanced.

BEST MODE FOR CARRYING OUT THE INVENTION

The best mode for the carrying out the invention will now be described in detail in connection with the accompanying drawings.

Figure 1:
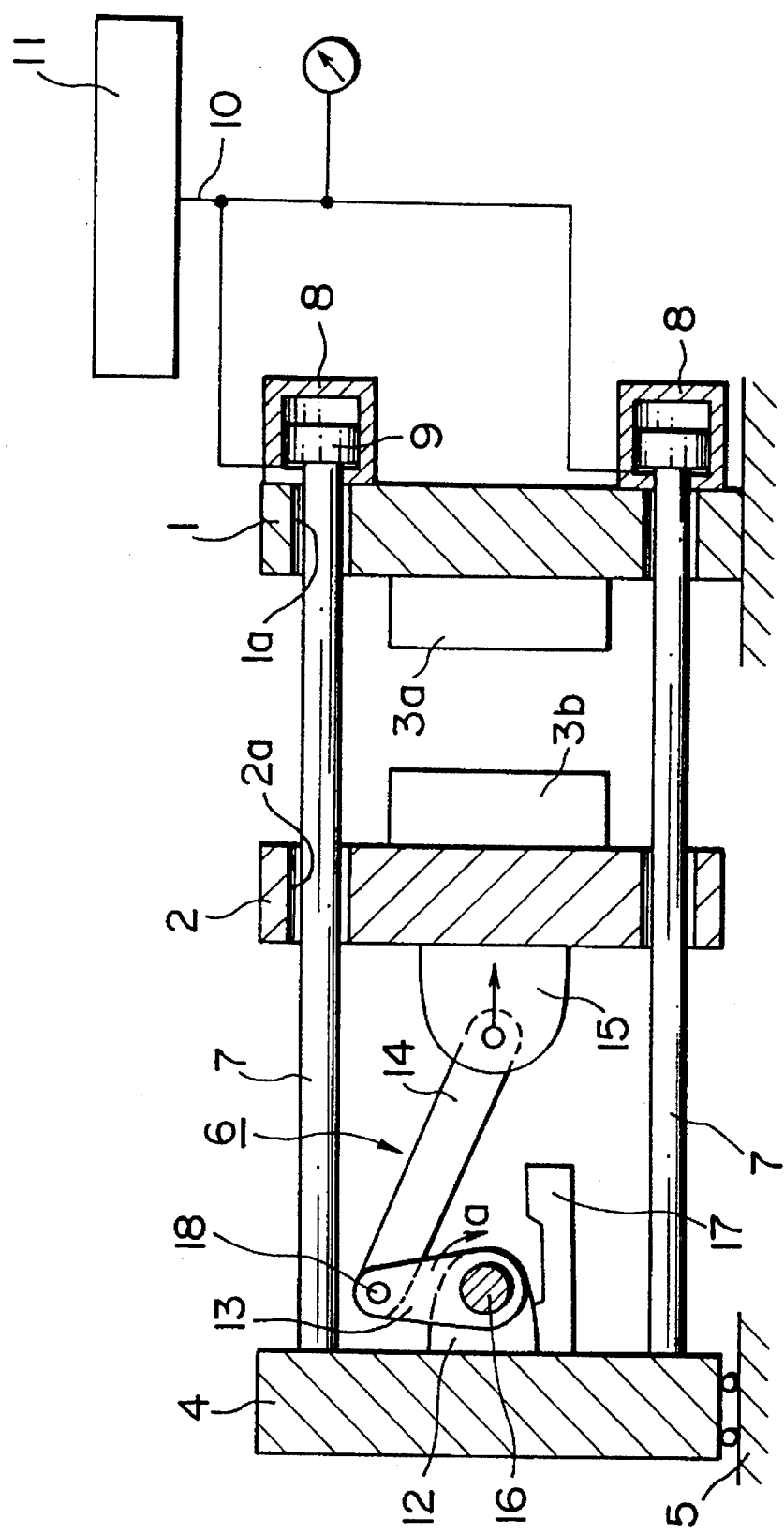
FIG. 1 is a schematic view of a clamping device for a prior art electric-powered injection molding machine.
Figure 2:
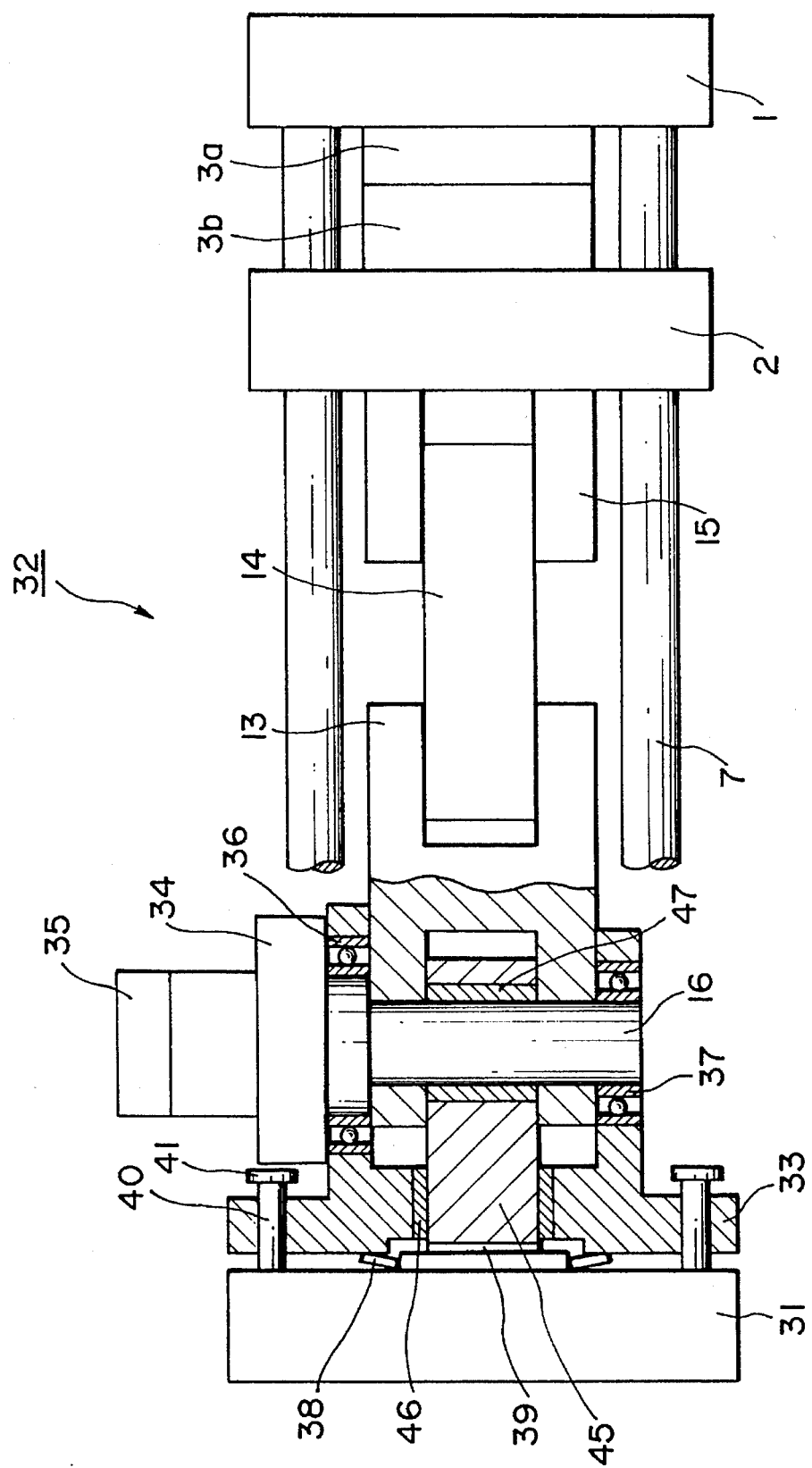
FIG. 2 is a schematic view of a clamping device for an electric-powered injection molding machine according to the present invention.

FIG. 2 is a schematic view of a clamping device for an electric-powered injection molding machine.

Referring to FIG. 2, the injection molding machine includes a stationary platen 1 and a movable platen 2, to which dies 3a and 3b of a mold are mounted, respectively, and a rear platen 31, so that the movable platen 2 is moved by a single-toggle mechanism 32 to perform the opening and closing of the mold.

Four parallel tie bars 7 are mounted at four corners of the stationary platen 1, respectively. Each of the tie bars 7 is slidably passed through the movable platen 2 and fixed at one end thereof to a toggle support which is not shown.

The single-toggle mechanism 32 includes a first link 13 which is disposed between a motor support 33 resiliently supported relative to the rear platen 31 and the movable platen 2, and which is rotatably supported relative to the motor support 33, a second link 12 pivotally connected to the first link 13, and a bracket 15 supporting the second link 14 for rotation and fixed to the movable platen 2.

The first link 13 has a shaft 16 which is connected to a drive shaft of a motor 35 (such as a servo motor) through a reduction device 34 which comprises a planetary gear reduction device or the like. The shaft 16 is rotatable in unison with the first link 13, and then the motor 35 is driven, a rotation reduced by the reduction device 34 is transmitted through the shaft 16 to the first link 13.

The shaft 16 is rotatably supported on the motor support 33 with roller bearings 36 and 37 interposed therebetween. A belleville spring 38 is disposed between the motor support 33 and the rear platen 31, and the motor support 33 is biased away from the rear platen 31 by the belleville spring 38. Such a biasing force is set smaller than the clamping force, so that the belleville spring 38 is compressed by reception of the clamping force.

A protrusion 39 is formed on the rear platen 31 to retain the belleville spring 38 and adapted to receive a reaction force against the clamping force. The motor support 33 is guided by a pin 40 for movement toward and away from the rear platen 31. An increased-diameter portion 41 is provided on a tip end of the pin 40 to limit the stroke of the motor support 33.

Thus, the motor 35 is driven to extend the first and second links 13 and 14 into a straight line, thereby bringing the dies 3a and 3b into contact with each other to perform the closing of the mold. Then, when a clamping cylinder (which is not shown) provided in the stationary platen 1 or the toggle support is operated to perform the clamping of the mold, a large clamping force is generated between the dies 3a and 3b, and a reaction force against the clamping force is transmitted through the movable platen 2, the bracket 15, the second link 14 and the first link 13 to the shaft 16.

In order to transmit the reaction force, received by the shaft 16, to the rear platen 31 at this time, without passing through the roller bearings 36 and 37, a rod 45 is provided as a reaction force transmitting member. The rod 45 is disposed in an opposed relationship to the protrusion 39 formed on the rear platen 31 for movement to abut against the protrusion 39, with one end thereof (adjacent the movable platen 2) passed through the motor support 33, so that the rod 45 may be moved by reception of the clamping force toward and away from the protrusion 39. A slide bearing 46 is mounted as a guide means between the motor support 33 and the rod 45, so that the rod 45 is guided by and slides within the slide bearing 46. Thus, when the motor support 33 has been moved toward the rear platen 31, by reception of the reaction force against the clamping force during clamping of the mold, the rod 45 and the protrusion 39 are brought into contact with each other with a shrinkage allowance left in the belleville spring 38. When the motor support 33 has been moved toward the movable platen 2 during opening of the mold, a gap is provided between the rod 45 and the protrusion 39.

A through-hole is provided in the other end (adjacent the rear platen 31 ) of the rod 45, and the shaft 16 is passed through the through-hole with a slide bearing 47 interposed therebetween. A clearance is defined between the shaft 16, the slide bearing 47 and the rod 45 enough to permit relative rotation.

The mold-opening/closing operation by the die-clamping device for the electric-powered injection molding machine will be described in connection with FIG. 3.

Figure 3:
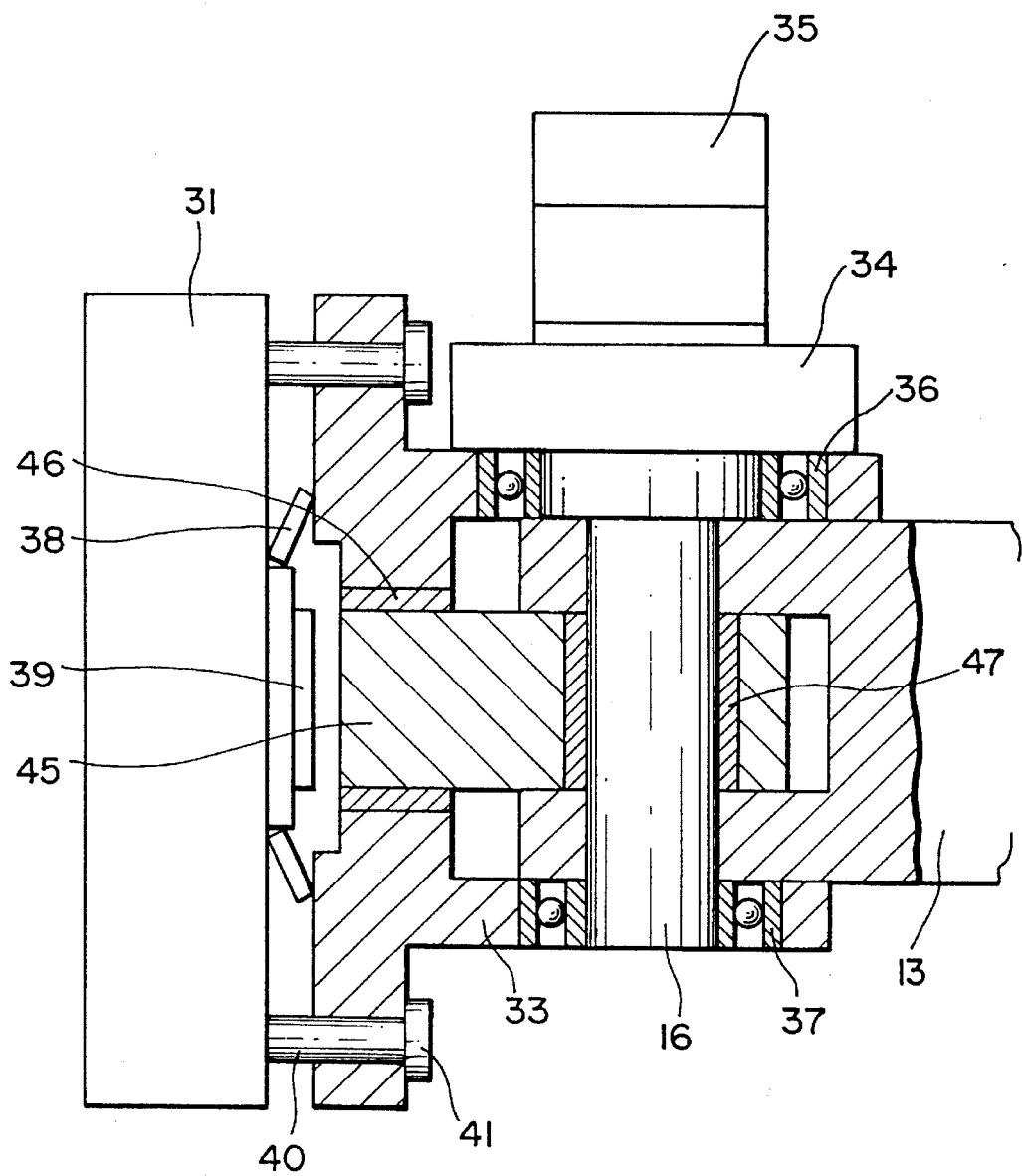
FIG. 3 is a sectional view of an essential portion of the clamping device for the electric-powered injection molding machine with a mold being in an opened state.

FIG. 3 is a sectional view of an essential portion of the clamping device for the electric-powered injection molding machine with the mold being in its opened state.

When injecting, pressure-maintaining and cooling steps have been completed, the die-clamping device starts a mold-opening motion, and the clamping force produced between the dies 3a and 3b is eliminated by this mold-opening motion. As a result, the reaction force against the clamping force, i.e., a force for biasing the motor support 33 toward the rear platen 31 is also eliminated. Thus, the belleville spring 38 allows the motor support 33 to be moved toward the stationary platen 1, while allowing the rod 45 to be moved away from the protrusion 39. The motor support 33 is stopped at a position in which it is locked by the increased-diameter portion 41 of the pin 40, and the motor support 33 is on standby in this state. At this time, no load is applied to between the shaft 16, the slide bearing 47 and the rod 45. Therefore, the shaft 16 is supported by the rolling bearings 36 and 37 and can be rotated smoothly.

When the motor 35, in the state shown in FIG. 3, rotates the shaft 16 through the reduction device 34, the first link 13 is rotated, so that the first and second links 13 and 14 are extended into a straight line to move the movable platen 2. As a result, the dies 3a and 3b are brought into contact with each other to achieve the closing of the mold. When the first link 13 is further rotated, a clamping force is generated between the dies 3a and 3b to effect the clamping of the mold. During this time, the reaction force against the clamping force is transmitted through the movable platen 2, the bracket 15, the second link 14 and the first link 13 to the shaft 16.

Thus, the motor support 33 is moved toward the rear platen 31 along the pin 40 while flexing the belleville spring 38, by reception of the reaction force transmitted to the shaft 16 through the roller bearings 36 and 37. With this movement, the rod 45 is also moved toward the rear platen 1 to come into contact with the protrusion 39 on the rear platen 31, as shown in FIG. 2. Until the rod 45 is brought into contact with the protrusion 39, no load is transmitted between the shaft 16, the slide bearing 47 and the rod 45. During this time, the reaction force against the clamping force is transmitted from the shaft 16 through the roller bearings 36 and 37 and the motor support 33.

Then, if the clamping force is increased, the reaction force against the clamping force is transmitted from the shaft 16 through the slide bearing 46 to the rod 45 and further through the protrusion 39 to the rear platen 31. Therefore, the roller bearings 36 and 37 cannot receive a further load. In addition, even if a large reaction force due to the clamping force is applied, it is received by the slide bearing 47 and hence, the roller bearings 36 and 37 cannot be deviationally worn or fractured.

In this way, the roller bearings 36 and 37 only receive a reaction force against the force required for the opening and closing of the mold during mold-opening and closing motions and the flexing force of the belleville spring 38, but cannot receive the reaction force against the clamping force during a mold-clamping motion.

It will be understood that the present invention is not limited to the above-described embodiment, and various modifications can be made on the basis of the subject matter of the present invention and are not excluded from the scope of the invention.

For example, in the above-described embodiment, the belleville spring 38 is disposed at the central portion of the rear platen 31, and the motor support 33 is biased by the belleville spring 38, but the belleville spring 38 or a coil spring may be disposed around the pin 40.

As discussed above, the die-clamping device for the electric-powered injection molding machine according to the present invention is suitable for use with an electric injection molding machine including a toggle mechanism for performing the opening and closing and the clamping of the mold by use of a motor as a drive source.

What is claimed is:
1. A clamping device for an electric-powered injection molding machine, comprising:
 (a) a stationary platen,
 (b) a rear platen disposed in an opposed relationship to said stationary platen,
 (c) a movable platen disposed between said stationary platen and said rear platen for advancing and retreating movements along tie bars,
 (d) a pair of dies respectively mounted on said stationary platen and said movable platen, the advancing movement of said movable platen clamping said dies together with a clamping force,
 (e) a motor support resiliently supported relative to said rear platen with a biasing force smaller than the clamping force,
 (f) a motor fixed to said motor support,
 (g) a toggle mechanism interconnecting said motor support and said movable platen for moving said movable platen by reception of the rotation of said motor, and
 (h) a reaction force transmitting member for transmitting a reaction force against the clamping force transmitted to said toggle mechanism, directly to the rear platen without transmitting through said motor support.

2. A clamping device for an electric-powered injection molding machine according to claim 1, wherein said reaction force transmitting member is a rod extending with one end abutable against said rear platen and with the other end supporting a shaft of said toggle mechanism.

3. A clamping device for an electric-powered injection molding machine according to claim 2, wherein the other end of said rod supports the shaft of the toggle mechanism through a slide bearing.

4. A clamping device for an electric-powered injection molding machine according to claim 3, wherein said rod is guided by a guide means disposed longitudinally with the rod.

5. A clamping device for an electric-powered injection molding machine according to claim 1, wherein said motor support supports a shaft of the toggle mechanism through roller bearings.

6. A clamping device for an electric-powered injection molding machine according to claim 1, wherein said motor support is resiliently supported by a spring member relative to said rear platen.

7. A clamping device for an electric-powered injection molding machine according to claim 2, wherein said motor support is resiliently supported by a spring member relative to said rear platen.

8. A clamping device for an electric-powered injection molding machine according to claim 3, wherein said motor support is resiliently supported by a spring member relative to said rear platen.

9. A clamping device for an electric-powered injection molding machine according to claim 4, wherein said motor support is resiliently supported by a spring member relative to said rear platen.

10. A clamping device for an electric-powered injection molding machine according to claim 5, wherein said motor support is resiliently supported by a spring member relative to said rear platen.

11. A clamping device for an electric-powered injection molding machine according to claim 5 wherein said toggle mechanism comprises first and second links, wherein said first link is fixed to said shaft for a rotation therewith and wherein said shaft is rotatably driven by said motor.

* * * * *